Figure 1:
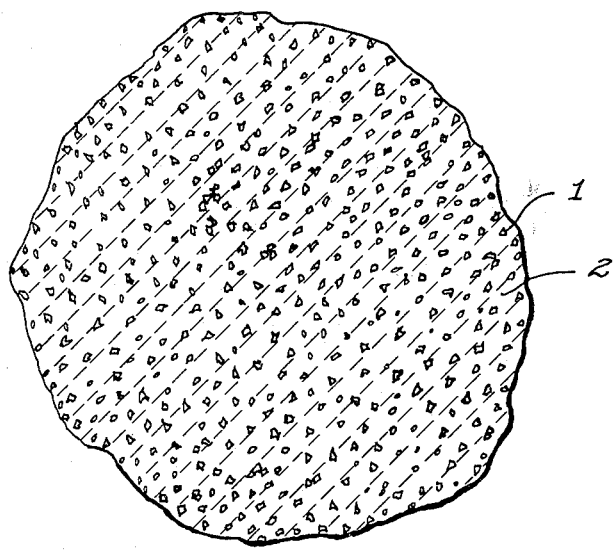

Dec. 27, 1955  TADAICHI HASHIMOTO  2,728,733
LIGHT-WEIGHT AGGREGATES OF PERLITE FINES AND CLAY
Filed Sept. 26, 1950

INVENTOR.
TADAICHI HASHIMOTO
BY

Gordon C. Mack
ATTORNEY

2,728,733

LIGHT-WEIGHT AGGREGATES OF PERLITE FINES AND CLAY

Tadaichi Hashimoto, Denver, Colo., assignor to Research Counsel, Inc., Denver, Colo., a corporation of Colorado Application September 26, 1950, Serial No. 186,798

2 Claims. (Cl. 252—449)

This invention relates to light-weight aggregates to be used as industrial oil and water absorbents. They are to be scattered on the floor of a machine shop or the like to absorb water and oil which are used in operating the various machines and are apt to run out over the floor. The aggregates must be sufficiently strong to in general withstand the weight of anyone stepping on them. They must be exceedingly absorbent. The aggregates of this invention are formed from fines from the popping of clay and are non-combustible. The invention includes the new aggregates and their preparation.

In general the aggregates for oil and water absorbents for which there is a demand, must absorb 100 per cent by weight of a No. 10 oil and 120 per cent by weight of water. These specifications vary from one purchaser to another. The maximum weight per cubic foot also varies but in general does not exceed about 40 pounds, and may advantageously be about 30 pounds. Aggregates of 6 to 60 mesh, or more usually between 15 and 30 mesh, are required. The aggregates of this invention will in general meet these specifications. The aggregates may be produced by crushing, but in general only a minor portion of the material used as an absorbent will be crushed. Generally it will be largely or wholly uncrushed aggregate.

Perlite ore is expanded or "popped" by heating, in order to prepare perlite granules for the market. In this operation a high percentage of fines is produced. These fines are porous, powdery and dust like. They are not suitable for the normal uses to which perlite is put, such as, for example, aggregate for use in concrete, plaster, etc., and large quantities of the fines are accumulated as waste at the popping furnaces. The popped material is separated by air classification. The material which is too small for use as plaster aggregate or concrete aggregate as specified in A. S. T. M. Specification C-130-42 is called fines in the industry. That specification required the following analysis for plaster and concrete aggregate:

|  | Percentage |
|---|---|
| Through No. 8 U. S. Standard sieve | 95 to 100 |
| Through No. 16 U. S. Standard sieve | 45 to 80 |
| Through No. 50 U. S. Standard sieve | 10 to 30 |
| Through No. 100 U. S. Standard sieve | 5 to 10 |

The plaster or concrete aggregate is collected in a first cyclone and the fines are passed over to a second cyclone where they are separately collected.

According to this invention these fines are agglomerated with clay. The fines may be mixed with the clay in dry form and water subsequently added to the dry mixture. Alternatively the clay may be first suspended in water and the fines added to the suspension. As a further alternative the fines may be suspended in water and the dry clay mixed with this suspension. The fines and clay may be separately suspended in water and the two suspensions mixed. The fines and clay may be mixed with the water in any desired manner.

The preferred clay for the use contemplated by this invention is bentonite, but any clay may be employed. Although non-gel forming (otherwise known as non-expanding) bentonite and other clays may be used, they are not as tacky when wet as the gel-forming clays, and are more apt to separate from water, on standing. Gel-forming bentonite is particularly preferred because it expands greatly when immersed in water and forms a homogeneous gel from which the clay does not separate on standing. When using a non-gelling bentonite, it may be desirable to add a small amount of the expanding type as it improves workability of the product, is more tacky, and hence will pelletize better. All clays after being wet form a plastic and then on being dried form a porous product. Fines from the popping of perlite are extremely porous and the agglomerates or pellets formed from the fines and clay are very porous and comparatively light-weight. They are particularly suited for use as oil and water absorbents, but may be used as desired. To give the granules sufficient strength to withstand the pressure exerted by a person weighing two hundred pounds or more, walking on them, it is necessary to thoroughly dry and fire the granules, but care must be taken not to produce a glaze on the surface of the granules which would interfere with their porosity and oil and water absorption. They must be heated to such a temperature that the clay portion of them will not become slimy when thereafter immersed in water.

The clay employed may be any of the usual clays, and although bentonite is preferred, any of the cheaper clays may be used, such as those generally employed for stoneware, sewer pipe, brick, pottery, etc. All of these clays when mixed with perlite fines and sufficient water to make a plastic mass, and then dried, and fired, will form a porous and absorbent product.

The aggregates of this invention may be produced in any one of a variety of different ways. For instance, the perlite fines and the clay may be mixed in dry, powdery form and water slowly added to the powder while it is being stirred. As more and more water is added to the stirred powdery mixture it will gradually ball up and form small, wet, individual pellets. It is not necessary to add to the mixture any more water than is required to form such pellets. The size of these pellets is regulated by the amount of water added and the extent of the stirring. They may be of any desired size, but when they are to be used (without crushing) for industrial oil and water absorbents, they are made of such a size that after firing they are between 6 and 60 mesh. A preferred size is between 15 and 30 mesh.

Another satisfactory way of producing the aggregates is to mix the fines and clay in sufficient water to produce a plastic mass and then form this into pellets in a pelletizing machine, such as an extrusion device with a cutting knife which severs the extruded ribbons at frequent intervals.

The pellets, however formed, are then dried and fired at a temperature from 1600° F. to 2000° F. but without forming a glaze on the surface. The heat treatment is more severe than mere baking in order to produce a product that does not soften when immersed in water. The density of the final product will run from 15 to 40 pounds per cubic foot.

The nature of the pellets is illustrated in the accompanying drawing which shows an enlarged cross section of a single pellet. It will be understood that the spacing of the fines 1, as illustrated, in the mass of clay 2, is purely illustrative. The invention will be further described by reference to the following examples.

Example I

The following materials are mixed in powdered form:

| | Grams |
|---|---|
| Expanded perlite fines (density 5.5 lb./cu.ft.; —30 mesh) | 100 |
| Powdered gel-forming bentonite (50 lb./cu.ft.) | 100 |

To the mixture of powdered materials 375 milliliters of water are slowly added while the mixture is being stirred. The powder takes up the water and forms little pellets of a size to pass through a No. 8 mesh screen. These pellets are dried and then heated to around 1600 to 2000° F.

The pellets produced in this manner have a density of 17 pounds per cubic foot. An increase in the bentonite content will increase their crushing strength. They will absorb about 200 per cent of their weight in oil.

Example II

The following materials are mixed together:

| | Grams |
|---|---|
| Expanded perlite fines (density 5.5 lb./cu.ft.; —30 mesh) | 100 |
| Powdered non-gelling bentonite (density 50 lb./cu.ft.; —30 mesh) | 300 |

The above powdery materials are mixed together and 350 milliliters of water are added while the powder is being stirred. This forms pellets which pass through a No. 10 mesh screen. These pellets are dried and fired at 1600 to 2000° F.

The resulting pellets have a density of 30 lb./cubic foot. They will absorb 150 per cent of their own weight of oil. Their size is quite uniform and their strength is greater than the strength of the perlite from which they are formed.

Example III

The same ingredients are used as in the second example except that an additional 50 milliliters of water is added while the mixture of bentonite and perlite is being stirred. The mass is then agitated by kneading or rotary motion or the like, while heating until about 60 milliliters of water has been evaporated. The mass is then extruded through a No. 8 mesh screen and the extruded ribbons are cut to pellets of about the same length as the diameter of the screen openings. The extrusion of the pellets gives them a very smooth surface which is somewhat denser than their interior. The pellets are then dried in a flat pan which is given a horizontal eccentric rotary motion to keep the pellets rolling during the drying operation. They are heated to 1600° F.

These pellets are hard-surfaced and have a higher compression strength than pellets formed by either of the preceding examples. They have a density of 32 lb./cubic foot and their oil absorption is 100 per cent by weight.

The pellets produced according to any of the foregoing examples may advantageously be cracked so that they separate into two or more parts, because this increases their oil absorption. If it is intended to crack the pellets they will originally be made of larger mesh and the broken product may be screened to separate particles of any desired size. The cracked or crushed product has high strength and forms a good industrial oil and water absorbent. The cracked particles may be mixed with uncracked pellets in the material offered on the market as an absorbent.

What I claim is:

1. Non-combustible aggregate consisting essentially of fines from the popping of perlite bonded together by clay, said mixture being fired at 1600 to 2000° F. without producing a glaze, said aggregate being porous throughout, measuring between 6 and 60 mesh, and being strong enough to withstand without substantial pulverization the weight of an average person walking on it.

2. Non-combustible aggregate consisting essentially of fines from the popping of perlite firmly bonded together by gel-forming bentonite, the mixture being fired at 1600 to 2000° F. without producing a glaze, the weight of the bentonite being greater than the weight of the fines, the aggregate being porous throughout, measuring between 15 and 30 mesh, having a density no greater than about 40 pounds per cubic foot, and being strong enough to withstand without substantial pulverization the weight of an average person walking on it.

References Cited in the file of this patent

UNITED STATES PATENTS

| | | |
|---|---|---|
| 1,927,102 | Sucetti et al. | Sept. 19, 1933 |
| 1,991,981 | Hillers | Feb. 19, 1935 |
| 2,015,381 | Harding | Sept. 24, 1935 |
| 2,275,816 | Ericson | Mar. 10, 1942 |
| 2,388,060 | Hicks | Oct. 30, 1945 |
| 2,460,811 | Davies | Feb. 8, 1949 |
| 2,478,757 | Foster | Aug. 9, 1949 |
| 2,487,207 | Adams | Nov. 8, 1949 |
| 2,569,323 | Maynard | Sept. 25, 1951 |

OTHER REFERENCES

Ralston: "Perlite, Source of Synthetic Pumice," I. C. 7364, pages 6, 10, 11 (August 1946).